United States Patent [19]

Snyder

[11] Patent Number: 4,941,922

[45] Date of Patent: Jul. 17, 1990

[54] STARCH-BASED CORRUGATING ADHESIVE CONTAINING FIBERS

[75] Inventor: Peter A. Snyder, Charlotte, N.C.

[73] Assignee: Harper/Love Adhesives Corporation, Charlotte, N.C.

[21] Appl. No.: 325,930

[22] Filed: Mar. 20, 1989

[51] Int. Cl.$^5$ ............................................. C09J 103/00
[52] U.S. Cl. ...................................... 106/214; 524/47; 524/50; 524/51; 524/52; 524/53
[58] Field of Search ...................... 106/214; 524/47–53

[56] References Cited

U.S. PATENT DOCUMENTS

| | | | |
|---|---|---|---|
| 2,610,136 | 9/1950 | Casey | 156/292 |
| 3,004,855 | 10/1961 | Smith et al. | 106/213 |
| 3,244,632 | 4/1966 | Schulz | 106/214 |
| 4,240,841 | 12/1980 | DiDominicis | 106/211 |
| 4,329,181 | 5/1982 | Chiu | 106/213 |
| 4,339,364 | 7/1982 | Krankkala | 524/44 |
| 4,343,654 | 8/1982 | Ware | 106/213 |
| 4,587,332 | 5/1986 | Lane | 536/102 |
| 4,750,974 | 6/1988 | Johnson | 106/214 |

*Primary Examiner*—Theodore Morris
*Attorney, Agent, or Firm*—Woodward, Emhardt, Naughton Moriarty & McNett

[57] ABSTRACT

An improved starch-based adhesive includes an adhesive of the carrier, no-carrier or carrier-no-carrier type and a quantity of fibers dispersed in the adhesive in an amount of from about 2.2 to about 22 pounds of fiber per 100 gallons of adhesive. The fibers may be selected from any of a large variety of natural or synthetic materials having desired properties for adhesion and dispersion, and yielding improved adhesive characteristics including increased waterproofness, dry strength, viscosity and adhesiveness.

13 Claims, No Drawings

STARCH-BASED CORRUGATING ADHESIVE CONTAINING FIBERS

BACKGROUND OF THE INVENTION

1. Field of the Invention:

The present invention relates to the field of corrugating adhesives, and particularly to a novel adhesive including fibers.

2. Description of the Prior Art:

Corrugated board is manufactured in a continuous process whereby, for example, a "medium" stock of paper is fluted with heat and pressure and then adhered to a "Kraft" liner a with starch-based adhesive. The resultant fluted medium and liner combination, known as a "single faced web", is pulled mechanically down to the "glue unit" where starch-based adhesive is applied to the exposed flutes. The web with adhesive is then combined with another "Kraft" liner and the resultant "double faced corrugated board" is dried out on the "hot plate section". Further processing of the combined board is achieved by in-line scoring, slitting and finally cutting to desired length. The sheets of combined board, a.k.a. corrugated board, are conveyed to "finishing equipment" for slotting, diecutting and/or printing.

The liners and the medium may be of various weights, measured as pounds of fiber per thousand square feet, and are manufactured from a combination of virgin and reclaimed fiber. Medium may in fact be manufactured from 100% reclaimed fiber. The strength of the paper is dependent on the amount of fiber per unit of paper and upon additives used in the manufacturing process. Because greater strength is required on the outside of a container, liners generally contain more strength additives than the medium contains. One of the most widely used additives is starch. Ranging from industrial unmodified corn starch to high priced specialty starches such as those with cationic, anionic, or amphoteric properties, starch is used in the manufacture of linerboard at the rate of 10 to 100 pounds of starch per ton of paper produced.

Historically, the liners and medium have been adhered in the manufacture of corrugated board with a mixture that contains:

1. Cooked Starch—a.k.a. carrier starch which is used for viscosity and tack properties;
2. Uncooked Starch—a.k.a. raw starch for drying and additional bonding properties unattainable by additional cooked starch due to viscosity limitations;
3. Caustic Soda—to assist in the cooking of the carrier starch and to lower the ultimate cooking temperature of the uncooked starch; and,
4. Borax—converted to meta-borate by caustic soda and in this form complexes with the cooked starch for additional viscosity and cohesive strength.

The resultant adhesive has a consistency not unlike that of thin pancake batter. Measurable parameters include viscosity, gel point and percent solids. The viscosity is measured by a cup device with a hole in it which allows a certain amount of adhesive to pass through it in a measured unit of time. The number of seconds required is the viscosity reported. The gel point is the measured temperature at which the uncooked starch in the adhesive begins to absorb water, or cook, and rapidly increases in viscosity. A test tube about half full with adhesive is held by a clamp and immersed in boiling water; the adhesive is agitated with a glass thermometer. The viscosity rise will be very noticeable. The temperature of occurrence is the gel point. The percent solids is simply the amount of total starch divided by the weight of the entire batch.

There are several varieties of unmodified and specialty starches available for enhanced performance on the corrugator. These products include starches which have been acid thinned to allow for additional cooked solids per batch while maintaining viscosity parity. Products of this type are known as specialty carrier starches. Other types of additives are used for cross-linking in the creation of a less soluble or insoluble glue line. These additives typically are either ketone-aldehyde or resorcinolic in nature. Boxes used for shipping fruit and vegetables are manufactured from these types of additives, sometimes in concert with a specialty carrier starch.

Several examples of corrugating adhesive formulations have existed in the prior art. The types of adhesive preparation include:

1. Carrier—A very discreet amount of cooked starch is responsible for the viscosity. The balance of the starch is uncooked.
2. No-Carrier—All of the starch is slightly cooked or swollen with heat and caustic soda for viscosity.
3. Carrier-No-Carrier—A discreet amount of cooked starch is responsible for about one-half of the viscosity. The rest of the viscosity is obtained by swelling the uncooked starch slightly.

There are several varieties of equipment available for the preparation of starch adhesive. Some are completely automatic, some manual, others a combination of the two. The prior art equipment prepares adhesive as either a carrier, no-carrier or carrier-no-carrier.

The usual starch-making process for corrugated board involves the use of a carrier and a raw (secondary) portion. The cooked starch is called the "carrier" because it suspends the uncooked starch present in its natural granular form. The thoroughly dispersed carrier forms strong films, provides the necessary application viscosity, and governs an adhesive's rheology (flow properties) and water-holding capacity. The uncooked portion remains inert until applied to the flute tips of the medium. The heat from the corrugation process causes this raw starch to gelatinize, absorbing large amounts of water, thus increasing viscosity. This action also decreases the availability of water for the carrier, increasing its viscosity as well. Triggered by the cooking of the raw starch, the carrier forms a matrix that adheres to the paper, bridging the liner to the medium interface.

A number of patents are directed to starch-based adhesives. Many of these disclose various formulas for the adhesive, or differing procedures for preparing the adhesive or its constituents.

The Chiu, U.S. Pat. No. 4,329,181, and Ware, U.S. Pat. No. 4,343,654 describe particular methods comprising certain steps for preparing an adhesive. Modifications of the starch component are described in the Lane, U.S. Pat. No. 4,587,332, and Casey, U.S. Pat. No. 2,610,136.

The DiDominicis, U.S. Pat. No. 4,240,841, discusses the general adhesive art including the Stein-Hall two component aqueous system and the "no-carrier" system. This patent is directed to the inclusion of a chemical flow modifier to control viscosity. Similarly, the Smith, U.S. Pat. No. 3,004,855, describes a method for preventing loss of viscosity by treating the starch with chemical stabilizers. The Krankkala, U.S. Pat. No.

4,339,364, discusses an adhesive formulation which includes a thickener, such as hydroxymethylcellulose, and a cross-linking agent, such as ureaformaldehyde and glyoxal.

SUMMARY OF THE INVENTION

Briefly describing one aspect of the present invention, there is provided an improved starch-based adhesive including an adhesive of the carrier, no-carrier and carrier-no-carrier type and a quantity of fibers in the amount of form about 2.2 to about 22 pounds per 100 gallons of the adhesive. Also provided is a method for producing the improved adhesive of the present invention.

It is an object of the present invention to provide a starch-based adhesive having enhanced characteristics, including increased waterproofness, dry strength, viscosity and adhesiveness.

Another object of the present invention is to provide an adhesive which may comprise any of the carrier, no-carrier, or carrier-no-carrier types and which has the enhanced characteristics described.

It is a further object of the present invention to provide a method for making an improved starch-based adhesive having enhanced properties.

Further objects and advantages of the present invention will become apparent from the description of the preferred embodiment which follows.

DESCRIPTION OF THE PREFERRED EMBODIMENT

For the purposes of promoting an understanding of the principles of the invention, reference will now be made to the embodiment and specific language will be used to describe the same. It will nevertheless be understood that no limitation of the scope of the invention is thereby intended, such alterations and further modifications, and such further applications of the principles of the invention as illustrated therein being contemplated as would normally occur to one skilled in the art to which the invention relates.

The present invention provides a corrugating adhesive that has several advantages over those of the prior art. The inventive adhesive includes fibers into a corrugating adhesive which otherwise may take the formulation of any of a variety of the known prior art formulations. Although specific examples will be given, as well as general comments as to corrugating adhesives and the use of certain components therein, it will be appreciated that the use of fibers can be employed in any adhesive for which the fiber contributes the desired properties and with which the fibers are compatible. As discussed in the description of the prior art, there are a wide variety of corrugating adhesives. These generally fall into the categories of carrier, no-carrier and carrier-no-carrier systems. The present invention contemplates the use of adhesives in any of these three categories. General requirements for a corrugating adhesive are that the adhesive be film-forming, that it wet the surfaces to be bonded, that it be of suitable "thickness" or "viscosity", and that it provide the desired bond strength.

A primary ingredient of corrugating adhesives is starch. Usually about 1/5 of the total starch is pre-cooked with caustic soda and added to a slurry or suspension of starch granules in water; this cooked portion of the adhesive is called the carrier. This name relates to its function as a suspending agent for the raw starch granules. Starch granules will very rapidly settle out of water unless they are kept rather well agitated. Settled starch tends to compact and form a semi-solid mass which is very difficult to re-disperse.

Without a high rate of agitation, starch granules will settle out in bends and low spots in pipes, glue pans, pumps, and any other place where the suspension is not kept moving sufficiently to prevent the particles from settling. It is not at all unusual for settled starch granules (when wet) to cause agitator blades, pump parts, etc., to break when an attempt is made to re-disperse this settled raw starch. Addition of cooked starch to the slurry, however, virtually prevents the starch granules from settling even in the absence of agitation. Coupled with the suspension of the granules, the carrier also imparts viscosity to the slurry and thereby regulates the amount of adhesive applied when the rolls are at a given setting. The carrier also regulates the rate at which water is lost from the slurry into the medium and liner in the interval between application of the adhesive and the development of a high enough temperature to begin the swelling of the starch granules.

Caustic soda, which is added to most corrugating formulations, plays quite a number of roles simultaneously. If a solution of caustic soda is added to a starch slurry, a point will be reached at which the starch will swell or "cook". This will occur even if the starch is at room temperature. Corn starch cooked with caustic soda has a tendency to be more stringy and cohesive than corn starch cooked merely by raising the temperature of a starch in water slurry. Without it, the cooked starch would be short and pasty.

The presence of caustic soda lowers the gelatinization temperature of the starch, but also has several important side effects. In the presence of caustic soda, the paper is more effectively wetted by water or starch dispersions than it is when caustic soda is not present. The caustic soda attacks the rosin sizing usually present in linerboard and gives the adhesive better "bite" into the paper. It also has a slight softening or swelling effect on the cellulose in the paper fibers, thus increasing the specific adhesion of the starch to the cellulose. The presence of caustic soda renders the adhesive formulation non-corrosive to iron and steel, removing the necessity for stainless steel lines, tanks and glue pans.

A third very common ingredient of corrugating adhesive is borax. Borax has a very unique reaction with starch. Corn starch cooked up in boiling water at about 6% solids will comprise a soft paste with mayonnaise-type characteristics. It produces good final adhesion between two pieces of paper, but has practically no tack or green strength and can only hold two pieces of paper together if it is not disturbed or if it is held in compression until it is practically dry.

On the other hand, if borax is added to the same starch solution, the viscosity will increase by two, three or four fold, depending on the amount of borax added up to about 10 or 15% borax by weight of the starch. The addition of the borax converts the starch from an opaque to a clear suspension, much higher in viscosity than the original sample and, rather than being a pasty mayonnaise type material, the starch solution is gummy, cohesive and highly tacky. Adding approximately an equal amount of caustic soda to the starch-borax combination will double the viscosity and tack above that achieved by addition of the borax alone. Yet addition of caustic soda by itself, while it will change the starch from opaque to clear and make it cohesive and fluid rather than pasty, does not have the effect on viscosity and tack that is obtained from the borax.

The last common material to be added to corrugating formulations is preservative. Despite the presence of caustic soda and the subsequent high pH of the adhesive, several species of bacteria, mold and yeast can survive and possibly do damage to the starch components. The most vulnerable starch in the system is the carrier portion. This thoroughly cooked out material is very accessible to the microorganisms and, as such, must be protected to avoid the risk of rapid viscosity loss.

The best prevention of viscosity loss due to bacteria, mold or yeast breakdown is twofold. Starch systems which are cleaned regularly with tri-sodium phosphate and some form of chlorine such as "Clorox TM" or "HTH" have a greatly reduced risk factor. Despite regular cleaning, some form of preservative is also recommended. It is practically impossible to run sterile adhesive, and therefore a certain level of microorganisms will be present. Regular use of preservative will keep microorganisms in the adhesive from reproducing too quickly.

Corrugating adhesive is typically a combination of water, uncooked starch, cooked starch and several chemicals. These components can be blend-fed in several different ways. The most common methods are described below.

The two tank method employs a primary and a secondary mixer. The primary mixer is round and has a volume ranging from 200 gallons to 400 gallons. This mixer has vertical agitation which consists of counter-rotating blades and side sweep arms. Agitation of this type is necessary for the tacky cohesive nature of the cooked or carrier starch, which is prepared in the primary mixer. This round mixer is mounted either on top of or next to the secondary mixer and the cooked carrier is either gravity-fed or pumped into the secondary mixer. The secondary mixer ranges from 750 to 840 gallons. It has a "V" or "U" shaped bottom with a rectangular top. Agitation is mounted horizontally along the bottom of the mixer. Six mixer propeller blades are recommended for maximum ability to keep the raw starch suspended before carrier addition and for proper carrier dispersion upon addition.

A typical two tank formulation and procedure is as follows:

| Primary Mixer | |
|---|---|
| 1. Add water | 100 gallons |
| 2. Add Unigel-W | 200 lbs. |
| 3. Heat to | 140° F. |
| 4. Add caustic soda | 30 lbs. |
| 5. Mix well | 20 minutes |
| 6. Add cooling water | 100 gallons |
| 7. Reheat to 110° F. if necessary | |
| 8. Mix at least 5 minutes | |
| Secondary Mixer | |
| 1. Add water | 350 gallons |
| 2. Heat to | 95° F. |
| 3. Add borax (5 mol) | 20 lbs. |
| 4. Add Unigel-W | 100 lbs. |
| 5. Add corn starch | 1000 lbs. |
| 6. Add Harlo-Cide | 1 lb. |
| Final Mix | |
| 1. Add primary to secondary slowly over 20-25 minutes. | |
| 2. Mix at least 15 minutes after addition. | |
| 3. Check viscosity and gel point. | |
| 4. Pump to storage. | |

Alternatively, a single tank method involves a carrier preparation and raw starch addition all taking place in one mixing vessel, normally the secondary mixer. A typical secondary mixer prepared single tank mix is as follows:

| Typical Single Tank Mix | |
|---|---|
| 1. Add water | 280 gallons |
| 2. Add corn starch | 200 lbs. |
| 3. Heat to | 140° F. |
| 4. Add caustic soda | 30 lbs. |
| 5. Mix 5 minutes | |
| 6. Add borax (5 mol) | 10 lbs. |
| 7. Mix 20 minutes | |
| 8. Add water | 250 gallons |
| 9. Reheat to 100° F. if necessary | |
| 10. Add corn starch | 1200 lbs. |
| 11. Add LoTemp 15/50 TM | 75 lbs. |
| 12. Mix well 5 minutes | |
| 13. Add borax (5 mol) | 10 lbs. |
| 14. Add Harlo-Cide | 1 lb. |
| 15. Mix well 15 minutes | |
| 16. Check viscosity and gel point | |
| 17. Pump to storage | |

Third, a low pressure jet cooker method employs a standard sized secondary mixer. A slurry of starch and chemicals is put into the mixer and then slowly pumped through a steam mixing chamber to facilitate cooking and create a carrier starch. At a pre-set viscosity point, the system stops jet cooking and flushes itself out. Additional raw starch is then added. The formulation would proceed as follows:

| Typical Low Pressure Jet Cook Formula | |
|---|---|
| 1. Add water | 500 gallons |
| 2. Preheat to | 80° F. |
| 3. Add caustic soda | 30 lbs. |
| 4. Add borax (10 mol) | 25 lbs. |
| 5. Add corn starch | 600 lbs. |
| 6. Mix 5 minutes | |
| 7. Jet cook until pre-set viscosity is met. (Alternately: jet cook for a pre-set time frame.) | |
| 8. Mix after jet cook cycle | 5 minutes |
| 9. Add corn starch | 600 lbs. |
| 10. Add LoTemp 15/50 TM | 75 lbs. |
| 11. Add Harlo-Cide | 1 lb. |
| 12. Mix for | 15 minutes |
| 13. Check viscosity and gel point | |
| 14. Pump to storage | |

A high pressure jet cooker differs from the low pressure type in the amount of starch cooked, the time of passage of the starch through the cooking environment and the pressure of the cook. High pressure jet cookers so thoroughly cook out starch that breakdown occurs and thus additional poundages are necessary for the normal viscosity levels of corrugating adhesive. An amount of water and starch are slurried in a primary type mixer. The balance of water and starch are in a secondary mixer. Chemicals may or may not be present in the secondary mixer at this point. The slurry in the primary mixer is pumped through a very long steam cooking chamber to facilitate complete cooking of the starch to form a carrier. The high pressure mixture of starch, steam and water is flashed down to atmospheric pressure and this 212° F. liquid starch solution is then added to the secondary mixer. The high adhesive temperature levels which result from this addition can cause problems, which may be eliminated by keeping the caustic soda and borax out of the secondary until the final step.

A typical formula would proceed as follows:

| Primary Slurry Tank | |
|---|---|
| 1. Add water | 200 gallons |
| 2. Add corn starch | 250 lbs. |
| Secondary Mixer | |
| 1. Add water | 300 gallons |
| 2. Do not heat | |
| 3. Add corn starch | 1200 lbs. |
| 4. Add LoTemp 15/50 TM | 75 lbs. |
| 5. Add Harlo-Cide | 1 lb. |
| Jet Cook | |
| 1. Pump primary slurry through jet cooker and into secondary mixer. | |
| Chemical Addition | |
| 1. Add a volume of pre-mixed caustic soda and borax. | |
| Final Mix | |
| 1. Agitate in the secondary mixer until smooth | |
| 2. Check viscosity and gel point | |
| 3. Pump to storage | |

No-Carrier adhesives are adhesives with no discrete cooked carrier used for viscosity purposes. The ultimate viscosity is obtained from partially swelling all the raw starch by chemical manipulation.

A Carrier-No-Carrier adhesive has a viscosity generated from a small amount of cooked starch and from a chemical swell of the raw portion.

Typical formulations are as follows:

| Typical No-Carrier Adhesives | |
|---|---|
| Primary Mixer | |
| 1. Add water | 100 gallons |
| 2. Add caustic soda | 40 lbs. |
| 3. Heat to | 130° F. |
| Secondary Mixer | |
| 1. Add water | 400 gallons |
| 2. Add corn starch | 1400 lbs. |
| 3. Heat to | 80° F. |
| Final Mix | |
| 1. Add primary to secondary. | |
| 2. Heat to | 100° F. if necessary |
| 3. Monitor viscosity. | |
| 4. At a preset viscosity point add boric acid | 18 lbs. |
| 5. Mix until smooth. | |
| 6. Pump to storage. | |

| Typical Carrier-No-Carrier Adhesive | |
|---|---|
| Primary Mixer | |
| 1. Add water | 100 gallons |
| 2. Add LoTemp 15/50 TM | 75 lbs. |
| 3. Add caustic soda | 40 lbs. |
| Secondary Mixer | |
| 1. Add water | 400 gallons |
| 2. Add corn starch | 1400 lbs. |
| 3. Heat to | 80° F. |
| Final Mix | |
| 1. Add primary to secondary. | |
| 2. Heat to | 100° F. if necessary |
| 3. Monitor viscosity. | |
| 4. At a preset viscosity point add boric acid | 18 lbs. |
| 5. Mix until smooth. | |
| 6. Pump to storage. | |

The present invention contemplates the addition of fibers to a corrugating adhesive to improve bonding and other properties of the adhesive. The adhesive may be any of the types previously described, namely the carrier, no-carrier or carrier-no-carrier systems. The adhesive may be prepared in accordance with any of the variety of methods available, including those specifically detailed in the preceding paragraphs. The timing and method of addition of the fibers may also be varied as desired. Typically, the fibers would be suspended initially in the uncooked-starch portion, suspended with the carrier portion, suspended prior to the carrier-no-carrier (or no-carrier) swell or added to the final adhesive mixture prior to storage or use.

The fibers employed by the present invention may include a variety of fibers which yield the desired attributes to the final adhesive and which are compatible therewith. As used herein, the term fibers refers to a quantity of separate thread-like materials capable of being dispersed in the adhesive. Suitable sources of fibers would include, for example, any source of cellulosic fiber including wood, paper, cotton and rayon; fibers of synthetic origin including nylon, polyester, polypropylene, Lycra spandex, Vyrene, vinyon, Dynel, Saran, Creslan acrylic, polyethylene, Teflon tetrafluoroethylene, glass, Corlon and metallic fibers. Also included are those fibers generated during the wheat or corn milling processes. The fibers should be suspendable in water, or at least in the adhesive mixture. Further the adhesive should have a suitable adhesion to the fibers to provide an adhesive with improved properties due to presence of the fibers.

The ratio of fibers to adhesive will determine the properties imparted to the adhesive by presence of the fibers. In a typical batch of adhesive, comprising 670 gallons, a useful amount of fibers would range, for example, from 15 pounds to 150 pounds per batch, or in other words, about 2.2 to about 22 pounds of fiber per 100 gallons of adhesive. The low end for the amount of fibers added may be assessed by evaluating the affect on the properties of the resultant adhesive. Addition of the fibers may have one or more effects of the adhesive, including increasing waterproof qualities as measured by TAPPI methods T-821 and T-812 which relate to wet pins and ply separation; increasing dry strength as measured by TAPPI method T-821 which relates to dry pins; and modifying viscosity. Further, the presence of fibers can lower gel point of the adhesive, and in particular may retain moisture around the starch globules to enhance the adhesive characteristics and prevent moisture from being soaked up into the fiberboard.

The present invention contemplates that an amount of fibers is added to the adhesive at least sufficient to be effective to yield a significant change, preferably at least 10% or more preferably at least 25%, in these or other desirable properties of the adhesive. Preferably, an amount of fibers is included which is effective to yield substantial improvements in bond strength, waterproofness or other parameters of the adhesive. There is no particular upper limit on the amount of fibers which can be added to an adhesive mixture. However, there will be an amount beyond which the addition of more fibers presents deleterious effects, such as increase in viscosity beyond a desirable limit. Also, any further enhancement of adhesive properties may be minimal for the addition of more fibers than a given amount; and cost, convenience or other practical limitations may apply.

Each of the adhesives prepared as shown in the following Examples 1-7 are formulated to provide unique advantages predicated by available mixing equipment and the production needs of the particular boxplant. The inclusion of the Harper/Love Adhesives Corporation products F-25, F-30, F-60 and F-65 will provide additional advantages and performance as it pertains to actual corrugator production speed and/or ultimate bond quality.

In the adhesives which contain F-25, Examples 1, 4 and 7, the hydrophilic nature of the additive will hold additional moisture on the glueline to allow for more complete gelling of the raw starch, thus enhancing the bond strength. This additional moisture will also assist the adhesive shown in Example 1, which contains a thermosetting resin. Thermosetting resins are used to provide a measure of water resistance to the glueline for better box performance in humid or wet environments. Additional moisture held on the glueline will enhance the crosslinking action of said thermosetting resin, thus providing a performance advantage. The presence of metallic fibers will ensure good heat transfer through the glueline, thus providing catalytic action as it pertains to the bonding process.

In the adhesives which contain F-30, Examples 2 and 3, the hydrophobic nature of the additive will help repel moisture from the glueline, thus speeding up the corrugator bonding process, which is essentially one of measured water removal. Faster drying times result in faster production speeds, a distinct advantage. The bond strength will not suffer as a result of this faster bonding time due to the advantage gained from fiber entanglement between the adhesive additive F-30 and the paper substrates being bonded.

In the adhesive which contains F-60, Example 5, the unique blend of fibers and starch provide a product which enhances water holdout, film forming properties and suspension properties, all of which are problematic when a non-carrier adhesive is used. Several plants need to manufacture adhesive in the no-carrier mode due to specific types of starch adhesive mixing equipment. The Harper/Love Adhesives Corporation product, F-60, will enable such boxplants to pursue business not normally capable of being produced with a no-carrier adhesive. No-carrier adhesive de-waters very quickly, which is a benefit when lightweight paper is run, but is a detriment on heavyweight paper, or multiple corrugated board such as double wall or triple wall. The ingredients of F-60 provide additional water holding power or water hold-out, which is necessary to maximize the gelling of the raw starch component, thus completing the bonding process. The presence of the fiber ingredient of F-60 also enhances bond strength due to fiber-to-fiber entanglement between adhesive and paper substrates being bonded.

In the adhesive which contains F-65, Example 6, the hydrophobic nature of the product will enhance the de-watering of the adhesive. The glass and metallic fiber components of F-65 will increase the heat transfer through the adhesive. Faster de-watering and increased heat transfer properties of the final adhesive will result in an adhesive product which can provide additional corrugator production line speed. The hydrophobic fiber component will ensure excellent bond strength in this faster bonding environment by the phenomenon of fiber-to-fiber entanglement between adhesive and paper substrates to be bonded.

F-25 has been designed to be hydrophilic in nature. Presented below are four combinations of ingredients which have been used successfully in production of F-25. Sample A is the most preferred to date. Samples B–D have been evaluated with moderate to good results.

|  | Diameter Range | Fiber Length | A | B | C | D |
| --- | --- | --- | --- | --- | --- | --- |
| Cellulosic Fiber | .0005"–.02" | .025"–.250" | 50% | 50% | 50% | 50% |
| Nylon Fiber | .0005"–.02" | .025"–.250" | 12.5% | 12.5% | 12.5% | 12.5% |
| Polypropylene Fiber | .0005"–.02" | .025"–.250" | 12.5% | 12.5% | 12.5% | 12.5% |
| Polyethylene Fiber | .0005"–.02" | .025"–.250" | — | — | — | — |
| Wheat Starch | N/A | N/A | 20% | — | 25% | — |
| Potato Starch | N/A | N/A | — | 20% | — | 25% |
| Stainless Steel Fiber | .0005"–.02" | .025"–.250" | 5% | 5% | — | — |

F-30 has been designed to be mostly hydrophobic in nature. Presented below are four combinations of ingredients which have been used successfully to produce F-30. Sample A is the most preferred to date. Samples B–D have been evaluated with moderate to good results.

|  | Diameter Range | Fiber Length | A | B | C | D |
| --- | --- | --- | --- | --- | --- | --- |
| Cellulosic Fiber | .0005"–.02" | .025"–.250" | 10% | 10% | 10% | 10% |
| Nylon Fiber | .0005"–.02" | .025"–.250" | 40% | 40% | 40% | 40% |
| Polypropylene Fiber | .0005"–.02" | .025"–.250" | 15% | 15% | 30% | — |
| Polyethylene Fiber | .0005"–.02" | .025"–.250" | 15% | 15% | — | 30% |
| Wheat Starch | N/A | N/A | — | 20% | — | 20% |
| Potato Starch | N/A | N/A | 20% | — | 20% | — |
| Stainless Steel Fiber | .0005"–.02" | .025"–.250" | — | — | — | — |

F-60 has been designed to be hydrophilic and to provide an early gel point for the finished adhesive. Presented below are four combinations of ingredients which have been used successfully to produce F-60. Sample A is the most preferred to date. Samples B–D have been evaluated with moderate to good results.

|  | Diameter Range | Fiber Length | A | B | C | D |
|---|---|---|---|---|---|---|
| Cellulosic Fiber | .0005"-.02" | .025"-.250" | 40% | 40% | 40% | 40% |
| Nylon Fiber | .0005"-.02" | .025"-.250" | 10% | 10% | — | — |
| Polypropylene Fiber | .0005"-.02" | .025"-.250" | — | — | 10% | 10% |
| Polyethylene Fiber | .0005"-.02" | .025"-.250" | — | — | — | — |
| Wheat Starch | N/A | N/A | 50% | — | 50% | — |
| Potato Starch | N/A | N/A | — | 50% | — | 50% |
| Stainless Steel Fiber | .0005"-.02" | .025"-.250" | — | — | — | — |

F-65 has been designed to be hydrophobic and to provide faster drying properties through enhanced heat transfer. Presented below are four combinations of ingredients which have been used successfully to manufacture quantities of F-65. Sample A is the most preferred embodiment to date. Samples B-D have been evaluated with moderate to good results.

|  | Diameter Range | Fiber Length | A | B | C | D |
|---|---|---|---|---|---|---|
| Cellulosic Fiber | .0005"-.02" | .025"-.250" | 10% | 10% | 10% | 10% |
| Nylon Fiber | .0005"-.02" | .025"-.250" | 30% | 30% | 15% | 15% |
| Polypropylene Fiber | .0005"-.02" | .025"-.250" | — | — | 15% | 15% |
| Polyethylene Fiber | .0005"-.02" | .025"-.250" | — | — | — | — |
| Wheat Starch | N/A | N/A | 25% | — | 25% | — |
| Potato Starch | N/A | N/A | — | 25% | — | 25% |
| Stainless Steel Fiber | .0005"-.02" | .025"-.250" | 30% | 5% | 20% | 15% |
| Glass Fiber | .0005"-.02" | .025"-.250" | 5% | 30% | 15% | 20% |

The following specific examples will further illustrate the invention and describe the preferred embodiments thereof.

EXAMPLE 1

A corrugating adhesive of the carrier-system type was made by the following procedure. In a primary mixer, 150 gallons of water were heated to 140° F. and 350 lbs. of Harlo-Bond 47, a high solids carrier starch available from Harper/Love Adhesives Corporation, was added to the water, along with 4 lbs. of borax and 34 lbs. of caustic soda which was dissolved in 10 gallons of water. This mixture was agitated for 20 minutes and an additional 100 gallons of water were added. In a secondary mixer, 350 gallons of water were heated to 100° F. and 1200 lbs. of corn starch were added. In addition, 15 lbs. of borax and 80 lbs. of Aquaseal W-200, a thermosetting resin material available from Harper/Love Adhesives Corporation, were added. Finally, to the secondary mixer 35 lbs. of a product called F-25 was added. F-25 is composed of a proprietary starch/fiber/chemical blend and is available from Harper/Love Adhesives Corporation.

The mixture in the primary mixer was then added slowly to that in the secondary mixer over 20-25 minutes, and the resulting combination was mixed for at least 15 minutes. After checking viscosity and gel point, the material was ready for storage and use.

EXAMPLE 2

A corrugating adhesive of the carrier-system type was made by the following procedure. In a primary mixer, 100 gallons of water were heated to 130° F. To this primary mixture one 50-lb. bag of F-30, a proprietary starch/fiber/chemical blend available from Harper/Love Adhesives Corporation, and 200 lbs. of Nabond, a carrier starch available from National Starch and Chemical Corporation, were added, along with 32 lbs. of caustic soda which was dissolved in 10 gallons of water. This mixture was mixed for 5 minutes. Thereafter, an additional 10 lbs. of borax were added and the resulting mixture is mixed well for a period of about 15 minutes. After mixing, an additional 10 gallons of water were added. In a secondary mixer, 320 gallons of water were heated to 90° F. and 1200 lbs. of corn starch were added. In addition, 12 lbs. of borax were added.

The mixture in the primary mixer was then added slowly to that in the secondary mixer over 20-25 minutes, and the resulting combination was mixed for at least 15 minutes. After checking viscosity and gel point, the material was ready for storage and use.

EXAMPLE 3

A corrugating adhesive of the carrier-system type was made by the following procedure. In a primary mixer, 100 gallons of water were heated to 140° F. and 200 lbs. of Ultra-Kor Starch, a carrier starch available from Corrugating Chemicals, Inc., was added to the water, along with 4 lbs. of borax and 36 lbs. of caustic soda in 10 gallons of water. This mixture was mixed for 20 minutes and an additional 100 gallons of water were added. In a secondary mixer, 300 gallons of water were heated to 90° F. and 1300 lbs. of corn starch were added. In addition, 15 lbs. of borax were added.

The mixture in the primary mixer was then added slowly to that in the secondary mixer over 20-25 minutes, and the resulting combination was mixed for at least 15 minutes. After the 15 minutes of blending was completed, one 50-lb. bag of F-30, a proprietary starch/fiber/chemical blend available from Harper/Love Adhesives Corporation, was added to the adhesive with the mixing for another 15 minutes. After checking viscosity and gel point, the material was ready for storage and use.

EXAMPLE 4

A corrugating adhesive of the carrier-system type was made by the following procedure. In a primary mixer, 150 gallons of water were heated to 140° F. and 200 lbs. of Unigel-W, a carrier starch available from Harper/Love Adhesives Corporation, was added to the water, along with 4 lbs. of borax and 26 lbs. of caustic soda in 10 gallons of water. Also added was one 50-lb. bag of F-25, a proprietary starch/fiber/chemical blend available from Harper/Love Adhesives Corporation. This mixture was mixed for 20 minutes and an additional 100 gallons of water were added. In a secondary mixer, 300 gallons of water were heated to 100° F. and 1200 lbs. of corn starch were added. In addition, 15 lbs. of borax and 100 lbs. of Unigel W, a carrier starch available from Harper/Love Adhesives Corporation, were added.

The mixture in the primary mixer was then added slowly to that in the secondary mixer over 20–25 minutes, and the resulting combination was mixed for at least 15 minutes. After checking viscosity and gel point, the material was ready for storage and use.

EXAMPLE 5

A corrugating adhesive of the no-carrier type was made by the following procedure. In a primary mixer, 100 gallons of water were heated to 110° F.; 100 lbs. of F-60, a proprietary starch/fiber/chemical blend available from Harper/Love Adhesives Corporation, and 44 lbs. of caustic soda were added in 10 gallons of water. The resulting combination was mixed for a period of 10 minutes. In a secondary mixer, 400 gallons of water were heated to 100° F. and 1200 lbs. of corn starch were added. The mixture of the primary mixer was added to that of the secondary over a period of 10 minutes. When the viscosity reached 15 sec. Love Cup, 18 lbs. of boric acid were added to the secondary mixer.

EXAMPLE 6

A corrugating adhesive of the carrier-no-carrier type was prepared according to the following procedure. In a primary mixer, 100 gallons of water were heated to 110° F. and 75 lbs. of LoTemp, a hydrophilic colloid product available from Harper/Love Adhesives Corporation, and 50 lbs. of F-65, a proprietary starch/fiber/chemical blend available from Harper/Love Adhesives Corporation, were added. In addition, 46 lbs. of caustic soda in 10 gallons of water were added to the mix, and the resulting combination was mixed for a period of 10 minutes. In the secondary mixer, 400 gallons of water were heated to 100° F. and 1200 lbs. of corn starch were added. The combination of the primary mixer was added to that in the secondary mixer over a period of 10 minutes. When the viscosity reached 15 sec., Love Cup, 100 lbs. of HL-7, a modified resorcinolic material available from Harper/Love Adhesives Corporation, and 20 lbs. of borax were added.

EXAMPLE 7

A corrugating adhesive of the carrier type was prepared according to the following procedure. In a secondary mixer 280 gallons of water was heated to 130° F. To this warm water 200 pounds of corn starch was added after the agitator was engaged. To this corn starch slurry 28 pounds of caustic soda was added without dilution. The mixture was mixed thoroughly for 20 minutes. After the 20 minute mix, 280 additional gallons of water was added to the secondary mixer. After 5 minutes of blending, 50 pounds of F-25, a proprietary starch/fiber/chemical blend available from Harper/Love Adhesives Corporation, was added to the secondary mixer. Then 1200 pounds of corn starch was added, followed by a 20 minute mix time. After the mix time, 24 pounds of borax was added and the adhesive was mixed for 10 more minutes.

What is claimed is:

1. An improved starch-based corrugating adhesive which consists essentially of:
   a corrugating adhesive including an aqueous mixture of starch, said adhesive being of a type selected from the group consisting of carrier, no-carrier, and carrier-no-carrier adhesives; and
   a quantity of fibers dispersed within said corrugating adhesive, said fibers being present in said corrugating adhesive in an amount of from about 2.2 to about 22 pounds of fiber per 100 gallons of corrugating adhesive, said fibers having a diameter range of between about 0.0005 inches and about 0.02 inches, said fibers having a length of between about 0.025 inches and about 0.25 inches.

2. The adhesive of claim 3 in which said fibers are selected from the group consisting of wood, paper, cotton, rayon, nylon, polyester, polypropylene, spandex, vinyon, saran, acrylic, polyethylene tetrafluoroethylene, glass and metal fibers.

3. An improved starch-based corrugating adhesive which comprises:
   a corrugating adhesive including an aqueous mixture of starch, said adhesive being of a type selected from the group consisting of carrier, no-carrier, and carrier-no-carrier adhesives;
   a quantity of fibers dispersed within said corrugating adhesive, said fibers being present in said corrugating adhesive in an amount of from about 2.2 to about 22 pounds of fiber per 100 gallons of corresponding adhesive, said fibers having a diameter range of between about 0.0005 inches and about 0.02 inches, said fibers having a length of between about 0.025 inches and about 0.25 inches; and
   at least one additive selected from the group consisting of caustic soda, borax and preservatives.

4. The adhesive of claim 3 in which said fibers are selected from the group consisting of wood, paper, cotton, rayon, nylon, polyester, polypropylene, spandex, vinyon, saran, acrylic, polyethylene, tetrafluoroethylene, glass and metal fibers.

5. The adhesive of claim 3 in which said fibers are present in an amount sufficient to increase by at least about 10% at least one of the properties selected from the group consisting of waterproofness, dry strength, viscosity, and adhesion.

6. A method for producing an improved starch-based adhesive which comprises adding to the starch-based adhesive an amount of from about 2.2 to 22 pounds of fibers per 100 gallons of the adhesive, the fibers having a diameter range of between about 0.005 inches and about 0.02 inches, the fibers having a length of between about 0.025 inches and about 0.25 inches, the adhesive being of the no-carrier type formed by at least partially swelling the starch in a water-starch mixture, the method comprising adding the fibers to the water-starch mixture prior to at least partial swelling of the starch.

7. A method for producing an improved starch-based adhesive which comprises adding to the starch-based adhesive an amount of from about 2.2 to about 22 pounds of fibers per 100 gallons of the adhesive, the fibers having a diameter range of between about 0.0005 inches and about 0.02 inches, the fibers having a length of between about 0.025 inches and about 0.25 inches, the adhesive being of the carrier type formed by dispersing in water a portion of cooked starch with a quantity of uncooked starch, the method comprising adding the fibers to the aqueous suspension of cooked starch prior to mixing with the uncooked starch.

8. A method for producing an improved starch-based adhesive which comprises adding to the starch-based adhesive an amount of from about 2.2 to about 22 pounds of fibers per 100 gallons of the adhesive, the fibers having a diameter range of between about 0.0005 inches and about 0.02 inches, the fibers having a length of between about 0.025 inches and about 0.25 inches, the adhesive being of the carrier-no-carrier type formed by the aqueous mixture of cooked starch and partially swelled starch, the method comprising adding the fibers to the cooked starch suspension prior to cooking of the starch.

9. A method for producing an improved starch-based adhesive which comprises adding to the starch-based adhesive an amount of from about 2.2 to about 22 pounds of fibers per 100 gallons of the adhesive, the fibers having a diameter range of between about 0.0005 inches and about 0.02 inches, the fibers having a length of between about 0.025 inches and about 0.25 inches, the adhesive being of the carrier-no-carrier type formed by the aqueous mixture of cooked starch and partially swelled starch, the method comprising adding the fibers to the partially swelled starch prior to the partial swelling of the starch.

10. The adhesive of claim 1 and which further includes at least one additive selected from the group consisting of caustic soda, borax and preservatives.

11. The adhesive of claim 10 and which includes caustic soda, borax and preservatives.

12. The adhesive of claim 3 and which includes at least two additives selected from the group consisting of caustic soda, borax and preservatives.

13. The adhesive of claim 12 and which includes caustic soda, borax and preservatives.

* * * * *